United States Patent Office 2,698,854
Patented Jan. 4, 1955

2,698,854

STEROID SULFOXIDES

Carl Djerassi, George Rosenkranz, and Jesus Romo, Mexico City, Mexico, assignors to Syntex S. A., Mexico City, Mexico, a corporation of Mexico No Drawing. Application January 31, 1951,
Serial No. 208,836

11 Claims. (Cl. 260—397.3)

The present invention relates to cyclopentanoperhydrophenanthrene compounds and to a process for preparing the same.

More particularly the present invention relates to novel 16-sulfoxide alkyl or aralkyl steroids and to 3-alkyl or aralkyl sulfoxide derivatives.

The compounds of the present invention are desirable therapeutics and are further useful as intermediates in the preparation of hormones and other therapeutics.

In the application of George Rosenkranz, Carl Djerassi and Jesus Romo, Serial No. 206,726, filed January 18, 1951, there is disclosed certain processes involving the reaction of $\alpha,\beta$-unsaturated steroid ketones with mercaptans and to novel derivatives produced thereby. In particular there is disclosed in the aforementioned application the preparation of various 3-thioenol ethers from $\Delta^4$-3-ketosteroids and there is also disclosed the addition reaction between mercaptans and the $\Delta^{16}$-20-ketone system of steroids, in particular pregnans, to produce the corresponding 16-thio compounds.

It has now been discovered, in accordance with the present invention, that 3-thioenol ethers of steroids may be oxidized with mild oxidizing agents to prepare the corresponding 3-sulfoxide derivatives. It has further been discovered in accordance with the present invention that the 16-thiosteroids may be similarly oxidized to the 16-sulfoxide compounds.

In general a typical reaction according to the present invention may be illustrated by reference to the following equation:

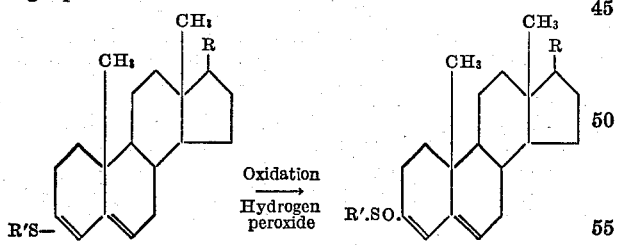

As an example of the compounds suitable for use in the above reaction, R may be COCH₃, COCH₂OAC or =O. Ac of course may stand for a suitable acyl group, as for example the acetate grouping. While the aforementioned types of compounds are given as an example, it is within the broad scope of the present invention to utilize in the above reaction any of the known 3-thioenol ethers or those disclosed in the aforementioned application, which are derived by reaction between appropriate mercaptans and a $\Delta^4$-3-ketosteroid.

In the above equation $R^1$ is preferably the benzyl radical but may be an alkyl radical, preferably a lower alkyl radical such as ethyl or any of the other alkyl radicals derived from the equivalent readily available mercaptans. Similarly other aralkyl mercaptans giving rise to the equivalent thioethers may be utilized to produce the thioether of the above equation so that $R^1$ may also be any aralkyl radical, such as derived from phenyl butyl mercaptan.

In practicing the process according to the present invention the preferred oxidizing agent is hydrogen peroxide and the thioenol ether may be dissolved in a suitable solution, as for example an alcohol solvent, i. e. ethanol and saturated sodium carbonate solution. The oxidation is carried out by heating for a short period of time, as for example from five to fifteen minutes on a steam bath. In the alternative the thioenol ether may be dissolved in a solvent, such as dioxane and allowed to stand at room temperature for a period of time, as for example, two days with hydrogen peroxide. Preferably the hydrogen peroxide is present in excess of the amount theoretically required for the oxidation above outlined.

The same oxidation procedures are applicable to the oxidation of 16-thioalkyl or 16-thioaralkyl pregnan derivatives previously referred to. As an example, reference is made to the following equation:

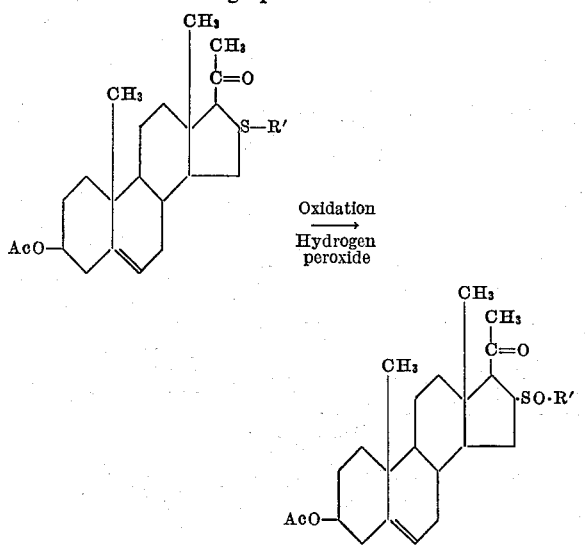

In the above equation $R^1$ has the same value as hereinbefore set forth and similar reaction conditions are suitable for carrying out the oxidation. Further, although the reaction has been illustrated in connection with a particular pregnan derivative, namely $\Delta^5$-pregnen-3$\beta$-ol-20-one 16-benzylsulfoxide 3-acetate, other pregnan derivatives derived from the addition of a mercaptan to the 16-17 double bond may be used.

The present process is also applicable to the oxidation of compounds possessing both the 16-thio grouping and the 3-thioenol ether grouping and the oxidation of these compounds may be illustrated by the following equation:

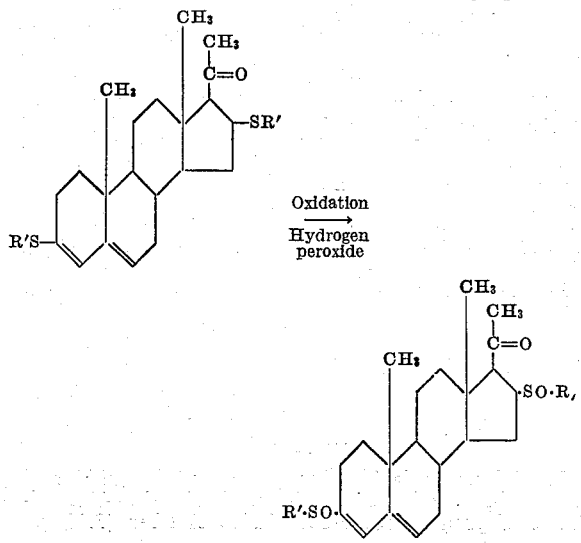

Here again $R^1$ refers to the same radicals as hereinbefore set forth which may be suitably derived from a mercaptan and the oxidation of the compound above set forth, namely 16-thiobenzylprogesterone 3-benzylthioenol ether may be carried out by dissolving the compound in a suitable solvent, such as ethanol and saturated sodium carbonate solution and heating together with hydrogen peroxide for a short period of time.

The sulfoxide compounds prepared in accordance with the above equations are acid stable, whereas the thioenol ethers are acid-labile and the 3-sulfoxide derivatives therefore make it possible to protect the $\Delta^4$-3-keto function under certain conditions in the presence of acidic reagents. The sulfoxide derivatives above set forth can be converted to the corresponding thioenol ethers by lithium aluminum hydride reduction thus constituting substantially the original compound. They may also be desulfurized with Raney-nickel catalyst, for example the hydrogenolysis of $\Delta^{3,5}$-androstadiene-17-one 3-benzylsulfoxide as by dissolving the same in a suitable solvent, such as acetone and refluxing with Raney nickel produced $\Delta^{3,5}$-androstadiene-17-one.

The following specific examples serve to illustrate but are not intended to limit the present invention:

Example I $\Delta^5$-pregnen-3$\beta$-ol-20-one 16-benzylsulfoxide 3-acetate. —A mixture of 2.5 g. of 16-thiobenzylpregnenolone acetate, 150 cc. of ethanol, 5 cc. of saturated sodium carbonate solution and 15 cc. of 30% hydrogen peroxide was heated for five minutes on the steam bath. The reaction product was diluted by pouring into a large volume of water and thereafter extracted with ether, washed with sodium carbonate and water and dried over anhydrous sodium sulfate. Recrystallization from hexane-acetone gave 1.5 g. (58%) of sulfoxide with melting point 141–143.5° C. $(\alpha)_D^{20}$ —35.3° (dioxane).

Analysis.—Calculated for $C_{30}H_{40}O_4S$: C, 72.55; H, 8.11; S, 6.44. Found: C, 72.30; H, 8.22; S, 6.51.
Desulfurization with Raney nickel gave 75% of $\Delta^5$-pregnen-3$\beta$-ol-20-one 3-acetate.

Example II $\Delta^{3,5}$ - androstadien - 17 - one 3 - benzylsulfoxide.—A hot solution of 1.0 g. of the thioenol ether $\Delta^4$-androsten-3,17-dione-3-benzylthioenol ether in 150 cc. of dioxane was treated with 10 cc. of 30% hydrogen peroxide solution for five minutes on the steam bath and then poured into water. Extraction with ether, evaporation and recrystallization of the solid residue from a mixture of methanol and methylene chloride gave 0.7 g. (67%) of the corresponding sulfoxide derivative with melting point 217–219° C. (decomposition), $(\alpha)_D^{20}$ —113° (dioxane), ultra-violet maximum at 258 mu (log E 4.35).

Analysis.—Calculated for $C_{26}H_{32}O_2S$: C, 76.43; H, 7.89; S, 7.83. Found: C, 76.60; H, 7.87; S, 7.56.
Acid hydrolysis in a manner effective for the cleavage of thioenol ethers resulted after refluxing for two hours in a 63% recovery of sulfoxide. Hydrogenolysis afforded 58% of $\Delta^{3,5}$-androstadien-17-one with melting point 80–82° C., ultra-violet maximum at 234 mu (log E 4.14).

Example III

Lithium aluminum hydride reduction of $\Delta^{3,5}$-androstadien-17-one 3-benzylsulfoxide.—A solution of 2.0 g. of the sulfoxide of Example II in 350 cc. of dry tetrahydrofuran was added over a period of fifteen minutes to a solution of 0.8 g. of lithium aluminum hydride in 50 cc. of tetrahydrofuran and the mixture was then refluxed for an additional fifteen minutes. After addition of water, the product was isolated by extraction with ether, washing with water, drying and evaporating. Crystallization from methanol afforded 1.1 g. (57%) of testosterone 3-benzylthioenol ether with melting point 164–166° C., $(\alpha)_D^{20}$ —114° (dioxane), ultra-violet maximum at 268 mu (log E 4.31). Acid hydrolysis yielded 82% of testosterone with melting point 152–154° C., $(\alpha)_D^{20}$ +109.7°, ultra-violet maximum at 242 mu (log E 4.25).

Example IV

The 3-benzylsulfoxide of progesterone 3-benzylthioenol ether $\Delta^{3,5}$-pregnadien-20-one 3-benzylsulfoxide.—The oxidation of progesterone 3-benzylthioenol ether (3.00 g.) was carried out on the steam bath by heating for fifteen minutes with 350 cc. of dioxane, 20 cc. of 30% hydrogen peroxide and 5 cc. of sodium carbonate solution. After dilution with water, the sulfoxide was extracted with a mixture of methylene chloride and ether and recrystallized from methylene chloride methanol: yield, 1.7 g. (48%), melting point 200–201° C., $(\alpha)_D^{20}$ —94.3° (dioxane), ultra-violet maximum at 258 mu (log E 4.20).

Analysis.—Calculated for $C_{28}H_{36}O_2S$: C, 77.02; H, 8.31; S, 7.33. Found: C, 77.45; H, 8.51; S, 7.30.

Example V

The 3-sulfoxide of desoxycorticosterone acetate 3 - benzylthioenol ether $\Delta^{3,5}$ - pregnadiene - 20 - one - 21-ol 3-benzylsulfoxide 21-acetate.—A solution of 5.0 g. of desoxycorticosterone acetate 3-benzylthioenol ether in 300 cc. of dioxane was allowed to stand at room temperature for forty-eight hours with 20 cc. of 30% hydrogen peroxide. Work-up similar to Example I followed by recrystallization from acetone-methanol produced 2.6 g. (50%) of the 3-sulfoxide of desoxycorticosterone acetate 3-benzylthioenol ether with melting point 171–173° C. (decomposition), $(\alpha)_D^{20}$—82.8° (dioxane), ultra-violet maximum at 258 mu (log E 4.32).

Analysis.—Calculated for $C_{30}H_{38}O_4S$: C, 72.84; H, 7.74; S, 6.46. Found C, 72.89; H, 8.10; S, 6.40.

We claim:

1. A new sulfoxide steroid compound selected from the class consisting of 3-aralkylsulfoxides of the $\Delta^3$-pregnene series, 3-aralkylsulfoxides of the $\Delta^3$-androstene series, 16-aralkylsulfoxides of the pregnane series, and 3,16-diaralkylsulfoxides of the $\Delta^3$-pregnene series.

2. A process for the production of a new sulfoxide steroid compound selected from the class consisting of 3-aralkylsulfoxides of the $\Delta^3$-pregnene series, 3-aralkylsulfoxides of the $\Delta^3$-androstene series, 16-aralkylsulfoxides of the pregnane series, and 3,16-diaralkylsulfoxides of the $\Delta^3$-pregnene series comprising oxidizing a corresponding compound selected from the group consisting of 3-aralkylthioenol ethers of the androstene series, 16-thioaralkyl ethers of the pregnane series and 3-aralkylthioenol ethers of the 16-thioaralkyl ethers of the pregnane series.

3. A process for the production of a new sulfoxide steroid compound selected from the class consisting of 3-aralkylsulfoxides of the $\Delta^3$-pregnene series, 3-aralkylsulfoxides of the $\Delta^3$-androstene series, 16-aralkylsulfoxides of the pregnane series, and 3,16-diaralkylsulfoxides of the $\Delta^3$-pregnene series comprising oxidizing with hydrogen peroxide a corresponding compound selected from the group consisting of 3-aralkylthioenol ethers of the androstene series, 16-thioaralkyl ethers of the pregnane series and 3-aralkylthioenol ethers of the 16-thioaralkyl ethers of the pregnane series.

4. A 3-benzylsulfoxide of the $\Delta^3$-androstene series.

5. A 3-benzylsulfoxide of the $\Delta^3$-pregnene series.

6. A 16-benzylsulfoxide of the pregnane series.

7. A new compound consisting of $\Delta^5$-pregnen-3$\beta$-ol-20-one 16-benzylsulfoxide 3-acetate having a melting point of 141–143.5° C.

8. A new compound consisting of $\Delta^{3,5}$-androstadien-17-one 3-benzylsulfoxide having a melting point of 217–219° C. with decomposition.

9. A new compound consisting of $\Delta^{3,5}$-pregnadien-20-one 3-benzylsulfoxide having a melting point of 200–201° C.

10. A new compound consisting of $\Delta^{3,5}$-pregnadien-20-one-21-ol-3-benzylsulfoxide 21-acetate having a melting point of 171–173° C. with decomposition.

11. A process for the production of testosterone which comprises reducing $\Delta^{3,5}$-androstadien-17-one 3-benzylsulfoxide with lithium aluminum hydride to form testosterone 3-benzylthioenol ether and hydrolyzing said last-mentioned ether with acid.

No references cited.